United States Patent [19]

Blanc et al.

[11] 4,037,035

[45] July 19, 1977

[54] HYDROPHILIC MODIFIED ACRYLIC POLYMERS PARTICULARLY HYDRODISPERSIBLE OR HYDROSOLUBLE MODIFIED ACRYLIC POLYMERS AND METHOD OF PREPARING THE SAME

[75] Inventors: Jean-Henri Blanc, Pau; Rene Pornin, Arthez-de-Bearn; Robert Voirin, Mourenx, all of France

[73] Assignee: Societe Nationale Elf Aquitaine (Production), Paris, France

[21] Appl. No.: 598,185

[22] Filed: July 23, 1975

[30] Foreign Application Priority Data

July 26, 1974 France ................... 74.26010

[51] Int. Cl.$^2$ .............. C08F 8/32; C08F 220/06; C08F 220/14; C08F 220/18
[52] U.S. Cl. ............... 526/16; 260/29.6 TA; 260/32.6 NA; 260/33.6 UA; 526/47; 526/49; 526/263; 526/264; 526/304; 528/493; 528/496
[58] Field of Search .............. 450/608.5, 619.5, 742; 260/80 M, 80.5 N, 80.5 R, 80.72, 80.73, 89.5 S, 86.1 R, 86.1 N; 526/16, 47, 49, 304, 307, 263, 264

[56] References Cited

U.S. PATENT DOCUMENTS

| | | | |
|---|---|---|---|
| 1,976,679 | 10/1934 | Fikentscher et al. | 8/6 |
| 2,109,877 | 3/1938 | Barrett | 260/2 |
| 2,956,046 | 10/1960 | Glavis et al. | 260/80.5 |
| 3,007,887 | 11/1961 | Essig | 260/29.6 |
| 3,117,108 | 1/1964 | Calvete | 260/80.5 |
| 3,453,245 | 7/1969 | Glavis | 260/78.5 |

*Primary Examiner*—Stanford M. Levin
*Attorney, Agent, or Firm*—Ostrolenk, Faber, Gerb & Soffen

[57] ABSTRACT

Novel hydrophilic modified acrylic polymers, which are, in particular, hydrosoluble or hydrodispersible. These novel polymers contain, expressed in molar percentages, p % of units derived from an acrylic acid or ester, $q$ % of units derived from an alkanolamine of said acid, $r$ % of units derived from the alkali metal, alkaline earth metal or ammonium salt of the said acid, and $s$ % of units derived from a vinylic monomer, $p$, $q$, $r$ and $s$ representing integers and being so selected that $1 \leq p \leq 99$, $0 \leq q \leq 96$, $0 \leq r \leq 99$ and $0 \leq s \leq 40$, and the sum $(p+q+r+s)$ is equal to 100.

29 Claims, No Drawings

HYDROPHILIC MODIFIED ACRYLIC POLYMERS PARTICULARLY HYDRODISPERSIBLE OR HYDROSOLUBLE MODIFIED ACRYLIC POLYMERS AND METHOD OF PREPARING THE SAME

The present invention relates to modified hydrophilic acrylic polymers, especially to hydrodispersible or hydrosoluble modified acrylic polymers. The invention also relates to a method for preparing such polymers.

A great number of hydrophilic polymers are known, especially polymers which are hydrodispersible or hydrosoluble, such as certain vinyl polymers, the most universally known of which are polyvinyl alcohols and polyacrylamides.

The present invention provides novel hydrophilic polymers, especially polymers which are hydrodispersible or hydrosoluble, which are derived from polyacrylic acids or esters.

The hydrophilic modified acrylic polymers according to the invention contain, expressed in mole %:

$p$ % units A having the formula:

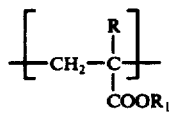

$q$ % units B having the formula:

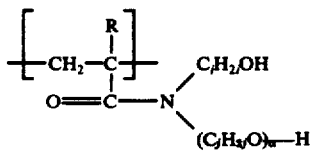

$r$ % units C having the formula:

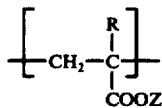

and $s$ % units D having the formula:

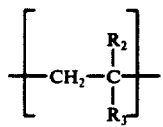

in which the formula R designates one or more radicals selected from the group comprising hydrogen and methyl and ethyl radicals, $R_1$ designates hydrogen or an alkyl radical containing 1 to 4 carbon atoms, Z designates one or more members of the group comprising the alkali metals, the alkaline earth metals, ammonium and the quaternary ammonium radicals having the formula:

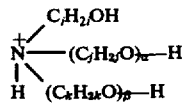

the proportion of Z representing the quaternary ammonium radicals being comprised between 0% and 10% of the entire amount of Z, while $i$, $j$ and $k$, which may be identical or different, are comprised between 1 and 6, and while $\alpha$ and $\beta$ are equal to 0 or 1, whereas $R_2$ represents one atom of hydrogen or/and a methyl radical, $R_3$ represents one or more monovalent radicals selected from the group comprising amido, amino, pyridyl and pyrrolidonyl radicals, and $p$, $q$, $r$ and $s$ represent integers and are so selected that $1 \leq p \leq 99$, $0 \leq q \leq 96$, $1 \leq r \leq 99$, and $0 \leq s \leq 40$, the sum $(p+q+r+s)$ being equal to 100, and more particularly $2 \leq p \leq 85$, $0 \leq q \leq 90$, $5 \leq r \leq 95$ and $0 \leq s \leq 30$.

The units A of the modified acrylic polymers are derived from one or more acrylic monomers selected from the group comprising the acrylic, methacrylic and ethylacrylic acids, and the alkyl acrylates, methacrylates and ethylacrylates the alkyl groups of which contains 1 to 4 carbon atoms.

The units B of said polymers are obtained from the units A by substituting the carboxylic acid group or the ester group by an alkanolamide radical, especially by an ethanolamide or diethanolamide radical, while the units C are derived from the units A by substituting the carboxylic acid group or ester group by an ammonium carboxylate group, an alkali metal or alkaline-earth metal carboxylate group, and possibly by an alkanolammonium carboxylate group.

As regards the units D, which are possibly present in minor amounts as compared to the combined amounts of units A, B and C, they are derived from one or more monomers preferably selected from the group comprising acrylamide, methacrylamide, vinylamide, vinylpyridine and vinylpyrrolidone.

The molecular weight of the hydrophilic modified acrylic polymers according to the invention may vary within rather broad limits. Advantageously, it may vary between $0.2 \times 10^6$ and $100 \times 10^6$, and more particularly between $0.4 \times 10^6$ and $50 \times 10^6$. The preferred molecular weight is comprised between $1 \times 10^6$ and $20 \times 10^6$.

An advantageous class of hydrophilic modified acrylic polymers according to the invention comprises the polymers composed only of units A, B and/or C in mole % proportions such that, with reference to the above defined symbols, $p$, $q$ and $r$, $1 \leq p \leq 99$, $0 \leq q \leq 96$, $1 \leq r \leq 99$, the sum $(p+q+r)$ being equal to 100. Said proportions are selected preferably in such a way that $2 \leq p \leq 85$, $0 \leq q \leq 90$, and $5 \leq r \leq 95$, and more particularly $5 \leq p \leq 80$, $2 \leq q \leq 80$ and $5 \leq r \leq 80$.

Amongst the modified polymers of this class, those polymers may be particularly mentioned which contain units A in the form of one or more of the following radicals:

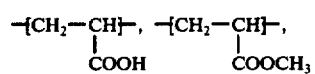

-continued

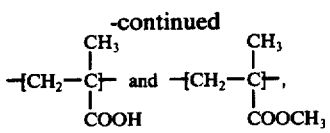

i.e. units which are derived respectively from acrylic acid, methyl acrylate, methacrylic acid and methyl methacrylate, while the units B are constituted by at least one of the following radicals:

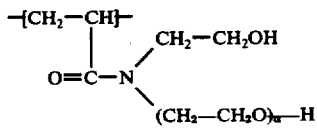

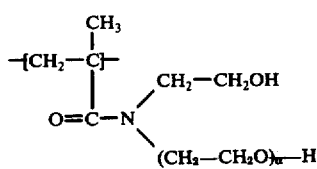

and units C being of the kind

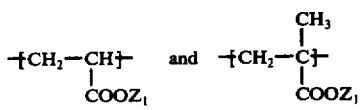

wherein $Z_1$ is at least one of the members constituting the group comprising sodium, potassium, ammonium and the quaternary ammonium radicals having the formula:

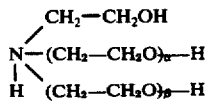

and wherein the proportion of $Z_1$ representing quaternary ammonium radicals is comprised between 0 and 10% of the entire amount of $Z_1$, while $\alpha$ and $\beta$ have the signification indicated hereinabove.

The method of preparing the hydrophilic modified acrylic polymers according to the present invention comprises the steps of reacting an acrylic polymer obtained by polymerization of one or more monomers leading to the units A possibly mixed with one or more monomers leading to the units D, with at least one alkanolamine having the formula:

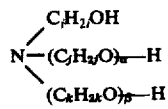

wherein $i$, $j$ and $k$ represent numbers comprised between 1 and 6, and wherein $\alpha$ and $\beta$, which may be identical or different, are equal to 0 or 1, then submitting the product obtained of said reaction to alkaline hydrolysis by treating it with an aqueous alkaline solution of a compound of an alkali metal, of an alkaline earth metal, or of ammonium, and finally separating the thus modified acrylic polymer from the hydrolysis medium.

The acrylic polymer reacted with the alkanolamine or alkanolamines may be prepared by any known method which leads to obtaining an acrylic polymer having a molecular weight close to the molecular weight of the hydrophilic modified acrylic polymer to be obtained. The acrylic polymer may be obtained, in particular, by emulsion or solution polymerization in the presence of a catalytic system of the so-called REDOX type, or by bulk polymerization under the effect of active radiation, especially of gamma rays.

The reaction of the acrylic polymer with the alkanolamine or alkanolamines such as monoethanolamine, diethanolamine and triethanolamine may be performed without any solvent or diluent. This reaction may also be performed in a solvent or diluent of the non-polar type, especially in an aromatic hydrocarbon, such as xylene or toluene, in an aliphatic or cycloaliphatic hydrocarbon, or in a solvent or diluent of the polar type, especially in an aqueous phase.

Depending on whether the solvent or diluent is non-polar (hydrocarbon) or polar (aqueous phase), the product resulting from the reaction of the acrylic polymer with alkanolamine or alkanolamines will contain a major amount of units B having an amide function, or of units C having a quaternary ammonium function.

The amount of alkanolamine which is reacted with the acrylic polymer may vary within wide limits. Thus the molar ratio between the amount of alkanolamine used and the amount of acrylic polymer may be comprised between 0.1 and 15, this ratio being preferably comprised between 0.3 and 5.

The reaction of the acrylic polymer and the alkanolamine or alkanolamines may be performed at temperatures comprised between 25° and 200° C, the preferred temperature range being 50° to 150° C. When the reaction is carried out in the presence of a solvent or a diluent, it is advantageous to perform said reaction at the boiling temperature of said solvent or diluent, or at a temperature close to said boiling temperature.

When the reaction of the acrylic polymer with the alkanolamine is performed by contacting said alkanolamine with a solution or dispersion of the acrylic polymer in a solvent or diluent, the polymer concentration of said solution or dispersion is advantageously comprised between 1 and 40% by weight, preferably between 3 and 40% by weight.

The duration of the reaction of the acrylic polymer and the alkanolamine or alkanolamines may vary within wide limits, depending on the desired alkanolamide and/or quaternary ammonium content of the product resulting from the reaction. This duration may be comprised more particularly between 30 minutes and 120 hours, preferably between 1 hour and 80 hours.

Advantageously, the hydrolysis of the product resulting from the reaction of the acrylic polymer and the alkanolamine or alkanolamines may be obtained by contacting said product, after separating the same from the reaction medium, with the aqueous solution of the alkali metal, alkaline earth metal or ammonium compound. When the reaction of the acrylic polymer and the alkanolamine or alkanolamines has been performed in an aqueous phase, it is possible to carry out the hydrolysis by adding the alkali metal, alkaline earth metal or ammonium compound or compounds to said aqueous phase.

The alkali metal, alkaline earth metal or ammonium compounds used for the hydrolysis may advantageously be selected from the group comprising oxides, hydroxides and carbonates of said alkali metals, alkaline earth metals or ammonium. It is particularly recommended to use to this end sodium hydroxide and potassium hydroxide.

The molar ratio of the amount of alkali metal, alkaline earth metal or ammonium compound or compounds to the amount of product resulting from the reaction of the acrylic polymer with the alkanolamine or alkanolamines, which ratio is equal to the molar ratio of the amount of alkali metal, alkaline earth metal or ammonium compound to the amount of initial acrylic polymer, may vary advantageously between 0.02 and 1.2 and is preferably comprised between 0.05 and 0.9.

The temperature at which the hydrolysis is performed may vary within wide limits, and may be comprised more particularly between 50° C and 150° C. However for convenience it is preferable to perform the hydrolysis at a temperature equal to the boiling temperature of the aqueous phase in which the hydrolysis is carried out, or at a temperature close to this boiling temperature.

The concentration of the polymer treated with the alkanolamines in the aqueous phase may be comprised advantageously between 0.5 and 60% by weight, said concentration being preferably comprised between 1 and 40% by weight.

The duration of the hydrolysis reaction may vary within wide limits depending on the amount of alkali metal carboxylates, alkaline earth metal carboxylates or ammonium carboxylates which are to be obtained in the resulting hydrophylic modified acrylic polymer. In most cases the said duration will be comprised between 1 hour and 80 hours, and more particularly between 5 and 60 hours.

The product resulting from the reaction of the acrylic polymer and the alkanolamine or alkanolamines, as well as the modified acrylic polymer resulting from the hydrolysis of the aforementioned reaction product, may be separated from their respective reaction media by any convenient known method adapted to achieve the separation of a polymer from its solution (precipitation in a medium in which the polymer is not soluble, evaporation of the volatile constituents of the solution) or from its suspension medium (filtration, centrifugation).

The following examples are given by way of illustration, but not of limitation, of the instant invention

EXAMPLES 1 to 18

Monoethanolamine (abbreviation : MEA) was reacted with methyl polyacrylates (abbreviation : MPA) having different molecular weights, dissolved in xylene (Examples 1 to 16) or in dimethylformamide (Examples 17 and 18), said methyl polyacrylates being prepared by polymerization of methyl acrylate dissolved in benzene in the presence of a free radical initiator, which was in the present instance azo-bis-isobutyronitrile.

The reaction of modification of the methyl polyacrylate by ethanolamine was performed at a temperature of 135° C during 16 hours (Examples 1 to 11), 40 hours (Examples 12 to 14), 27 hours (Example 15), 24 hours (Examples 16 and 17) and 7 hours (Example 18), respectively.

The reactive mixture was then cooled to ambient temperature so as to precipitate the acrylic polymer treated with ethanolamine, said polymer then being separated by filtration, and washed alternatively with acetone and methanol.

TABLE I

| | Reaction between MPA and MEA | | | | Hydrolysis | | Modified acrylic polymer obtained | | | |
|---|---|---|---|---|---|---|---|---|---|---|
| | | MPA concentration in the solvent % by weight | molar ratio MEA MPA | molar ratio NaOH MPA | MPA concentration in water % by weight | duration (hours) | Molar composition %* | | | solubility in water |
| Examples | molecular weight of MPA | | | | | | units A | units B | units C | |
| 1 | 0.82 × 10⁶ | 6.6 | 0.6 | 0.3 | 3 | 8 | 46 | 26 | 28 | very good |
| 2 | 0.82 × 10⁶ | 6.6 | 0.6 | 0.5 | 2 | 16 | 41 | 25 | 34 | very good |
| 3 | 0.87 × 10⁶ | 8.3 | 1.05 | 0.3 | 3 | 16 | 21 | 58 | 21 | very good |
| 4 | 0.87 × 10⁶ | 8.3 | 1.05 | 0.68 | 3 | 16 | 8 | 46 | 46 | very good |
| 5 | 1.15 × 10⁶ | 8 | 1.05 | 0.68 | 4 | 16 | 9 | 50 | 41 | very good |
| 6 | 1.9 × 10⁶ | 8 | 1.05 | 0.68 | 4.5 | 16 | 14 | 35 | 51 | very good |
| 7 | 4 × 10⁶ | 5 | 1.05 | 0.68 | 2 | 16 | 21 | 37 | 42 | good |
| 8 | 0.78 × 10⁶ | 8 | 2. | 0.15 | 3.8 | 16 | 17 | 70 | 13 | good |
| 9 | 0.87 × 10⁶ | 10 | 2 | 0.1 | 5 | 16 | 7 | 87 | 6 | |
| 10 | 0.87 × 10⁶ | 10 | 2 | 0.3 | 5 | 24 | 9 | 69 | 22 | very good |
| 11 | 1.8 × 10⁶ | 6 | 2 | 0.3 | 3 | 20 | 8 | 74 | 18 | very good |
| 12 | 0.87 × 10⁶ | 8.3 | 1.5 | 0.15 | 3 | 16 | 5 | 76 | 19 | |
| 13 | 0.87 × 10⁶ | 8 | 1.5 | 0.3 | 2.5 | 23 | 10 | 65 | 25 | very good |
| 14 | 0.65 × 10⁶ | 8 | 1.5 | 0.15 | 3 | 16 | 7 | 80 | 13 | very good |
| 15 | 4 × 10⁶ | 5 | 1.5 | 0.3 | 2 | 24 | 4 | 76 | 20 | good |
| 16 | 3.9 × 10⁶ | 5 | 1.5 | 0.3 | 1.5 | 45 | 11 | 67 | 22 | very good |
| 17 | 2.8 × 10⁶ | 5 | 1.05 | 0.68 | 3 | 21 | 47 | 24 | 29 | |
| 18 | 2.8 × 10⁶ | 4.3 | 1.05 | 0.68 | 3 | 16 | 42 | 20 | 38 | |

The product resulting from the reaction of methyl polyacrylate and ethanolamine was then introduced into an aqueous sodium hydroxide solution, and the mixture thus obtained was heated to a temperature of 100° C and maintained at this temperature during various periods of time.

The hydrolysis medium was then cooled to ambient temperature, and the modified acrylic polymer was separated from the hydrolysis medium and dried under vacuum in an oven at 50° C.

The specific operating conditions and the results obtained are listed in Table I hereinafter.

The formulas of units A, B, C of the acrylic polymers according to Examples 1 to 18 are the following:

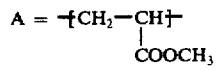

-continued

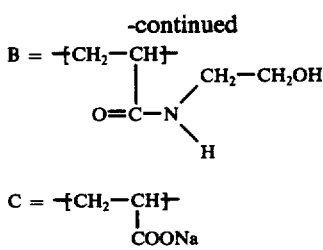

EXAMPLE 19

Monoethanolamine was reacted with a polyacrylic acid having a molecular weight of $0.8 \times 10^6$ (test I) and with a polymethacrylic acid having a molecular weight of $0.9 \times 10^6$ (test II), in an aqueous solution at a temperature of about 110° C, with a molar ratio monoethanolamine: polymer equal to 1.05 (test I) and equal to 0.7 (test II).

After separating the reaction medium the product resulting from the reaction of the polyacrylic acid or the polymethylacrylic acid with monoethanolamine was introduced into an aqueous solution of sodium hydroxide, and the resulting mixture was heated to a temperature of 100° C.

The hydrolysis medium was then cooled to ambient temperature, and the modified polymer was separated from the hydrolysis medium and dried under vacuum in an oven at 50° C.

The modified polymer obtained in test I contained, by moles, 20% units A having the formula:

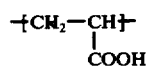

9% units B having the formula:

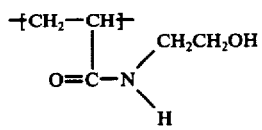

and 71% units having the formula:

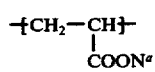

As regards the modified polymer obtained in test II, the same contained
40% units A having the formula:

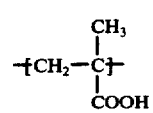

12% units B having the formula:

-continued

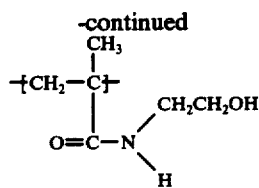

and 48% units C having the formula:

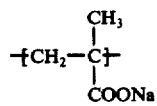

EXAMPLE 20

The same operating procedure as the one described in Example 1 was used, while however replacing the methyl polyacrylate by an ethyl polyacrylate having a molecular weight of $0.9 \times 10^6$ (test III) or by a methyl polymethacrylate (test IV), and using diethanolamine instead of monoethanolamine.

The modified polymer obtained in test III contained, by moles, 48% units A having the formula:

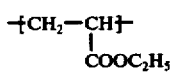

20% units B having the formula:

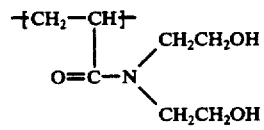

and 32% units C having the formula:

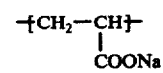

As regards the modified polymer obtained in test IV, the same contained, by moles,
45% units A having the formula:

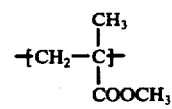

22% units B having the formula:

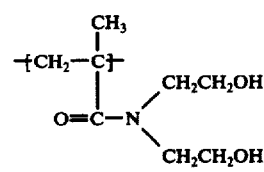

and 33% units C having the formula:

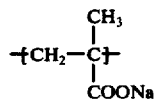

The hydrophilic modified acrylic polymers according to the invention may be advantageously used where it is endeavoured to improve the flow conditions of an aqueous liquid in a conduit. Indeed, adding a small amount of one of said modified polymers to an aqueous liquid flowing in a conduit results in considerably reducing the turbulence which is produced by the displacement of said liquid in said conduit. When performing flow tests in the presence and in the absence of the modified polymer, respectively, flow rates improved by about 15 to 20% where obtained, with a reduction of about 50 to 60% of the friction, when the flowing aqueous liquid contained 5 to 300 ppm of one of the modified polymers according to the invention.

What is claimed is:

1. modified acrylic polymers dispersible or soluble in water, comprising expressed in mole %:

$p$ % units A having the formula:

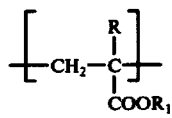

$q$ units B having the formula:

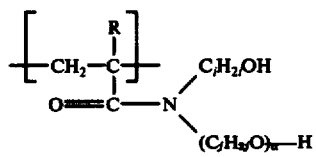

$r$ % units C having the formula:

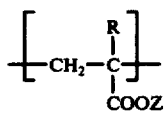

and $s$ % units D having the formula:

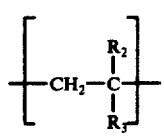

wherein each R designates hydrogen, and methyl or ethyl radicals, $R_1$ designates hydrogen or an alkyl radical with 1 to 4 carbons, Z designates at least one alkali metal, alkaline earth metal or quaternary ammonium radicals having the formula:

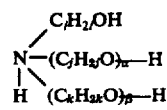

the proportion of Z representing the quaternary ammonium radicals being between 0% and 10% of the entire amount of Z, while $i, j$ and $k$, which may be identical or different, are comprised between 1 and 6, and while $\alpha$ and $\beta$ are equal to 0 or 1, whereas $R_2$ represents one atom of hydrogen a methyl radical, $R_3$ represents one or more monovalent amido, amino, pyridyl or pyrrolidinyl radical, and $p, q, r$ and $s$ represent integers which are so selected that $5 \leq p \leq 99$, $2 \leq q \leq 80$, $5 \leq r \leq 80$, and $0 \leq s \leq 40$, the sum $(p+q+r+s)$ being equal to 100.

2. Polymer according to claim 1, the molecular weight of which is comprised between $0.2 \times 10^6$ and $100 \times 10^6$.

3. Polymer according to claim 1, wherein $s$ is 0.

4. Polymer according to claim 1, the molecular weight of which is between $0.4 \times 10^6$ and $50 \times 10^6$.

5. Polymer according to claim 4, the molecular weight of which is comprised between $1 \times 10^6$ and $20 \times 10^6$.

6. Polymer according to claim 3, wherein the units A comprise at least one radical having the formula:

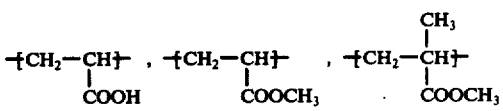

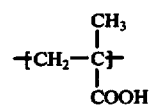

, wherein the units B comprise at least one radical having the following respective formula:

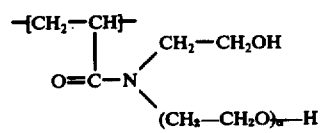

or

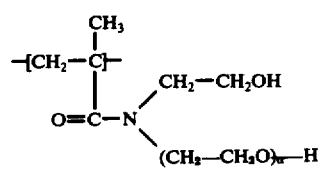

and wherein the units C comprise at least one of the radical having the following respective formula:

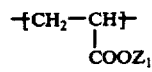

or

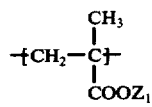

while $Z_1$ represents at least one member of the group of sodium, potassium, and the quaternary ammonium radicals having the formula:

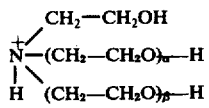

the proportion of $Z_1$ representing the quaternary ammonium radicals being comprised between 0 and 10% of the entire amount of $Z_1$, while $\alpha$ and $\beta$, which may be identical or different, are equal to 0 or 1.

7. A method of preparing hydrophile modified acrylic polymers according to claim 1, comprising the steps of reacting between 50°–150° C. an acrylic polymer which is derived from one or more monomers producing units A, with at least one alkanolamine having the formula:

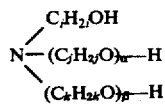

wherein $i, j, k$ represent numbers comprised between 1 and 6, and wherein $\alpha$ and $\beta$, which may identical or different, are equal to 0 or 1, then submitting the product resulting from the aforesaid reaction to alkaline hydrolysis by treating the same with an aqueous alkaline solution of an alkali metal or alkaline earth metal compound, and separating the thus obtained modified acrylic polymer from the hydrolysis medium.

8. A method according to claim 7, wherein the amount of alkanolamine reacted with said acrylic polymer is so selected that the molar ratio of said amount of alkanolamine to the amount of polymer is comprised between 0.1 and 15; preferably between 0.3 and 5

9. A method according to claim 7, wherein the reaction of alkanolamine with said acrylic polymer is performed in a solvent or diluent, the acrylic polymer concentration in the solvent or diluent being between 0.5 and 60% by weight.

10. A method according to claim 7, wherein the reaction of alkanolamine with said acrylic polymer is performed in a non-polar solvent or diluent.

11. A method according to claim 9, wherein the acrylic polymer concentration in the solvent or diluent is comprised between 1% and 60% by weight.

12. A method according to claim 9, wherein the reaction of alkanolamine with said acrylic polymer is performed at a temperature substantially equal to the boiling temperature of said solvent or diluent.

13. A method according to claim 7, wherein said alkali metal or alkaline earth metal compound used for the hydrolysis is an oxide, hydroxide or carbonate.

14. A method according to claim 7, wherein the molar ratio of the amount of alkali metal or alkaline earth metal compound to the amount of acrylic polymer is comprised between 0.02 and 1.2.

15. A method according to claim 7, wherein the concentration of the polymer treated with alkanolamine in the aqueous hydrolysis phase is comprised between 0.5 and 60% by weight.

16. A method according to claim 15, wherein the hydrolysis is performed at a temperature comprised between 50° C and 150° C.

17. A method according to claim 7, wherein the acrylic polymer to be modified is derived from at least one monomer selected from the group consisting of acrylic, methacrylic, ethylacrylic acids, alkyl acrylates, methacrylates and ethylacrylates the alkyl radical of which contains 1 to 4 carbon atoms.

18. A method according to claim 7 wherein the alkanolamine or alkanolamines are selected from the group consisting of monoethanolamine, diethanolamine and triethanolamine.

19. A method according to claim 18, wherein the acrylic polymer to be modified is derived from at least one monomer selected from the group consisting of acrylic acid, methacrylic acid, methyl acrylate and methyl methacrylate.

20. A method according to claim 19, wherein the hydrolysis of the product resulting from the reaction of said acrylic polymer and the alkanolamine is performed by means of an aqueous solution of sodium hydroxide.

21. A method according to claim 7 wherein said monomer producing units A is mixed with at least one monomer producing units D.

22. A method according to claim 7 wherein the amount of alkanolamine reacted with said acrylic polymer is so selected that the molar ratio of said amount of alkanolamine to the amount of polymer is between 0.3 and 5.

23. A method according to claim 9 wherein said solvent or diluent is a polar solvent or diluent.

24. A method according to claim 23 wherein said polar solvent or diluent is water and the acrylic polymer concentration in the water is between 3% and 40% by weight.

25. A method according to claim 10 wherein said non-polar solvent or diluent is an aliphatic, cycloaliphatic or aromatic hydrocarbon and the acrylic acid polymer concentration in the solvent or diluent is between 3% and 40% by weight.

26. A method according to claim 25 wherein said solvent or diluent is xylene or toluene.

27. A method according to claim 7 wherein said alkali metal or alkaline earth metal compound is sodium hydroxide or potassium hydroxide, wherein the molar ratio of the amount of sodium or potassium hydroxide to the amount of acrylic polymer is between 0.05 and 0.9, and wherein the concentration of the polymer treated with alkanolamine in the aqueous hydrolysis phase is between 1% and 40% by weight.

28. A method according to claim 16 wherein the hydrolysis is performed at a temperature substantially equal to the boiling temperature of the aqueous hydrolysis phase.

29. A method according to claim 17 wherein said alkyl radical is methyl or ethyl.

* * * * *